United States Patent
Adachi

(10) Patent No.: US 7,904,638 B2
(45) Date of Patent: Mar. 8, 2011

(54) NONVOLATILE MEMORY CARD HAVING IMPROVED COMPATIBILITY WITH DIFFERENT MEMORY CARD STANDARDS

(75) Inventor: Masaharu Adachi, Ikeda (JP)

(73) Assignee: Ricoh Company, Ltd., Tokyo (JP)

( * ) Notice: Subject to any disclaimer, the term of this patent is extended or adjusted under 35 U.S.C. 154(b) by 1016 days.

(21) Appl. No.: 11/709,415

(22) Filed: Feb. 21, 2007

(65) Prior Publication Data

US 2007/0204101 A1 Aug. 30, 2007

(30) Foreign Application Priority Data

Feb. 22, 2006 (JP) ................. 2006-044922

(51) Int. Cl.
*G06F 12/00* (2006.01)
*G06F 13/00* (2006.01)
(52) U.S. Cl. .......... 711/103; 711/100; 711/154; 365/222
(58) Field of Classification Search .................. 365/222; 711/100, 103, 154, 115
See application file for complete search history.

(56) References Cited

U.S. PATENT DOCUMENTS

| | | | | |
|---|---|---|---|---|
| 5,249,154 A | * | 9/1993 | Tai et al. | 365/221 |
| 5,802,579 A | * | 9/1998 | Crary | 711/149 |
| 5,841,696 A | * | 11/1998 | Chen et al. | 365/185.11 |
| 5,860,157 A | * | 1/1999 | Cobb | 711/103 |
| 6,259,633 B1 | * | 7/2001 | Chen et al. | 365/189.04 |
| 6,778,440 B2 | * | 8/2004 | Fournel et al. | 365/185.21 |
| 2004/0199721 A1 | * | 10/2004 | Chen | 711/115 |
| 2005/0094463 A1 | * | 5/2005 | Nishizawa et al. | 365/222 |
| 2005/0201177 A1 | * | 9/2005 | Shiraishi et al. | 365/222 |
| 2006/0036897 A1 | * | 2/2006 | Lin et al. | 714/5 |
| 2006/0095650 A1 | * | 5/2006 | Perroni et al. | 711/103 |
| 2008/0272197 A1 | * | 11/2008 | Nishizawa et al. | 235/492 |
| 2009/0046533 A1 | * | 2/2009 | Jo | 365/230.03 |
| 2009/0100307 A1 | * | 4/2009 | Lee | 714/746 |

FOREIGN PATENT DOCUMENTS

| | | |
|---|---|---|
| JP | 2002-73522 | 3/2002 |
| JP | 2003-186582 | 7/2003 |
| JP | 3102396 | 3/2004 |
| JP | 2006-268459 | 10/2006 |
| JP | 2006-330925 | 12/2006 |

* cited by examiner

*Primary Examiner* — Tuan V. Thai
(74) *Attorney, Agent, or Firm* — Cooper & Dunham LLP

(57) ABSTRACT

A nonvolatile memory card includes a nonvolatile memory, two or more nonvolatile memory card controllers, and a common memory controller. The nonvolatile memory stores data. The two or more nonvolatile memory card controllers have properties different from each other. The common memory controller is configured to commonly operate with the two or more nonvolatile memory card controllers to interface data access from each of the two or more nonvolatile memory card controllers to the nonvolatile memory.

7 Claims, 3 Drawing Sheets

NONVOLATILE MEMORY CARD HAVING IMPROVED COMPATIBILITY WITH DIFFERENT MEMORY CARD STANDARDS

TECHNICAL FIELD

The present disclosure relates to a nonvolatile memory card, and more particularly to a nonvolatile memory card having a flexible compatibility for various different standards with a simple structure.

DISCUSSION OF THE BACKGROUND

Referring to FIG. 1, one example of a background nonvolatile (NV) memory card is explained. As illustrated in FIG. 1, a background nonvolatile (NV) memory card 102 includes a nonvolatile (NV) memory 104 and a memory card controller 108 for reading and writing the NV memory 14 and for interfacing with a host computer 120. As also illustrated in FIG. 1, the background NV memory card 102 is inserted into a card inserter 124 of the host computer 120. The host computer 120 includes a memory card host controller 122 which can read and write data relative to the background NV memory card 102 placed in the card inserter 124.

The background NV memory card 102 of FIG. 1 is provided with only one nonvolatile (NV) memory card controller 108 and, therefore, it may have no compatibility to other nonvolatile (NV) memory card host controllers in conformance with different standards of nonvolatile memory card. On the other hand, since the host computer 120 is provided with one card inserter 124, more than one NV memory card cannot be installed at a time. Under such a circumstance, another nonvolatile (NV) memory card 202 shown in FIG. 2 has been introduced. As illustrated in FIG. 2, the NV memory card 202 includes first and second nonvolatile (NV) memory card controllers 208a and 208b which allow the NV memory card 202 to have compatibilities to two different standards of nonvolatile memory card. That is, the NV memory card 202 can be installed in two different host computers having different nonvolatile memory card host controllers.

In the NV memory card 202, each of the first and second NV memory card controllers 8a and 8b receives an interface signal S1 and a select signal S2 from a host computer (not shown) to exchange data with the host computer. The interface signal S1 transmits data to and from the first and second NV memory card controllers 8a and 8b, and the select signal S2 switches between the first and second NV memory card controllers 8a and 8b.

The NV memory card 202, however, raises a problem of large circuit size since the first and second NV memory card controllers 208a and 208b include nonvolatile memory controllers 206a and 206b, respectively, each for controlling the NV memory 104.

In addition, if the NV memory 104 has some restrictive conditions for access from the NV memory controllers 206a and 206b, for example, these conditions may affect the first and second NV memory card controllers 208a and 208b. In other words, in such a case, it may not be possible to apply any kinds of nonvolatile memory card controller to be installed in the NV memory card 202.

FIG. 3 shows another nonvolatile (NV) memory card 302 in which each of first and second NV memory card controllers 308a and 308b is configured to directly access to the NV memory 104. Accordingly, a nonvolatile memory card controller using a physical data format permitted by the NV memory 104 can only be applied. Otherwise, any nonvolatile memory card controllers cannot be usable.

BRIEF SUMMARY

A nonvolatile memory card includes a nonvolatile memory, two or more nonvolatile memory card controllers, and a common memory controller. The nonvolatile memory stores data. The two or more nonvolatile memory card controllers have properties different from each other. The common memory controller is configured to commonly operate with the two or more nonvolatile memory card controllers to interface data access from each of the two or more nonvolatile memory card controllers to the nonvolatile memory.

Another nonvolatile memory card includes a nonvolatile memory, a nonvolatile memory card controller, a nonvolatile memory card interface converter, and a bidirectional buffer. The nonvolatile memory card interface converter is configured to convert at least one kind of nonvolatile memory card interface including a first nonvolatile memory card interface into a second nonvolatile memory card interface. The first nonvolatile memory card interface represents a nonvolatile memory card interface directly coupled to the nonvolatile memory card interface converter and the bidirectional buffer. In this structure, a data access relative to a first nonvolatile memory card between the nonvolatile memory card interface and the nonvolatile memory is performed through the bidirectional buffer and the nonvolatile memory card controller. On the other hand, a data access relative to a second nonvolatile memory card between the nonvolatile memory card interface and the nonvolatile memory is performed through the nonvolatile memory card interface converter and the nonvolatile memory card controller.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
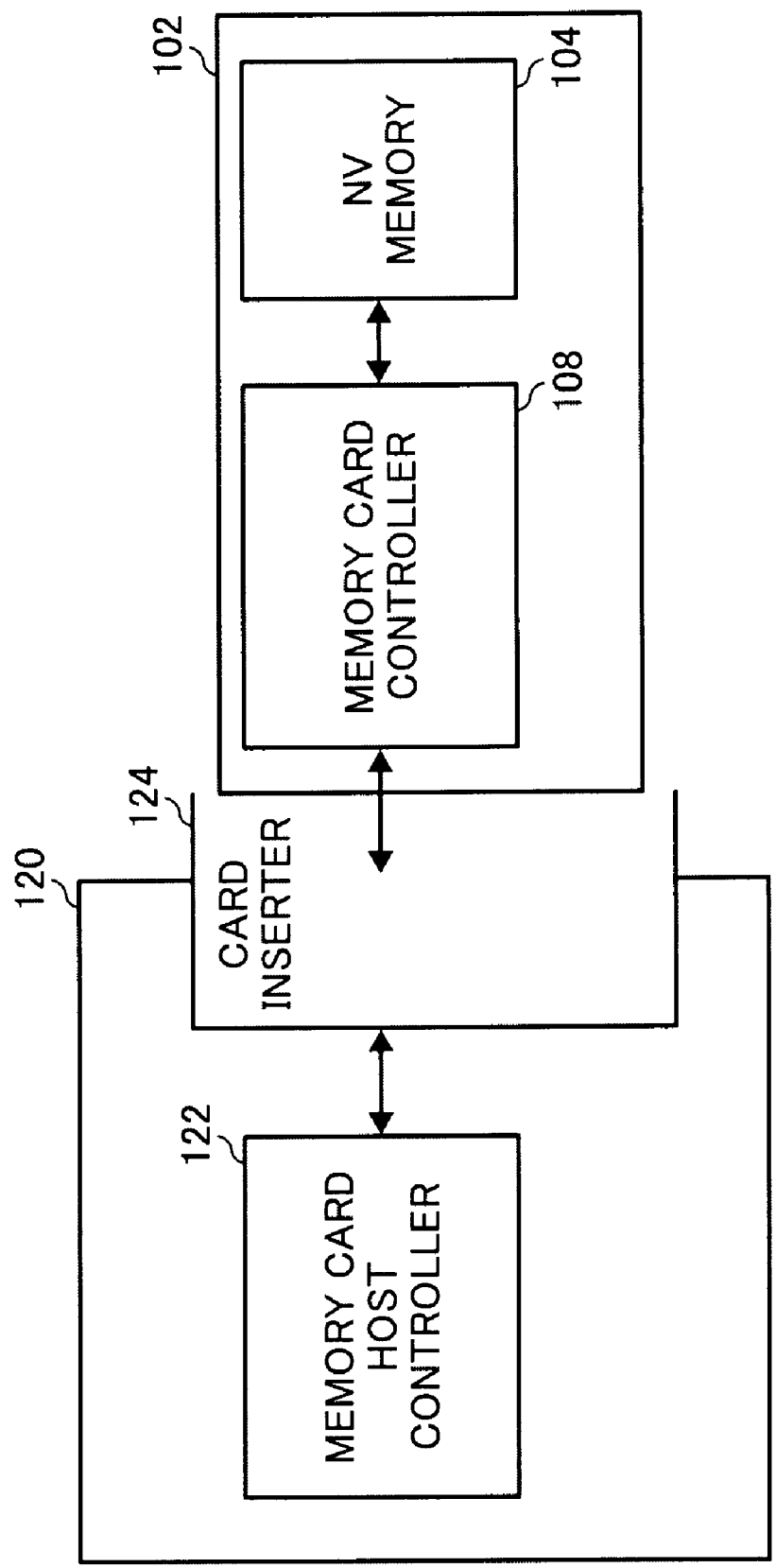
FIG. 1 is an illustration of a host apparatus and a background nonvolatile memory card installed in the host apparatus.
Figure 2:
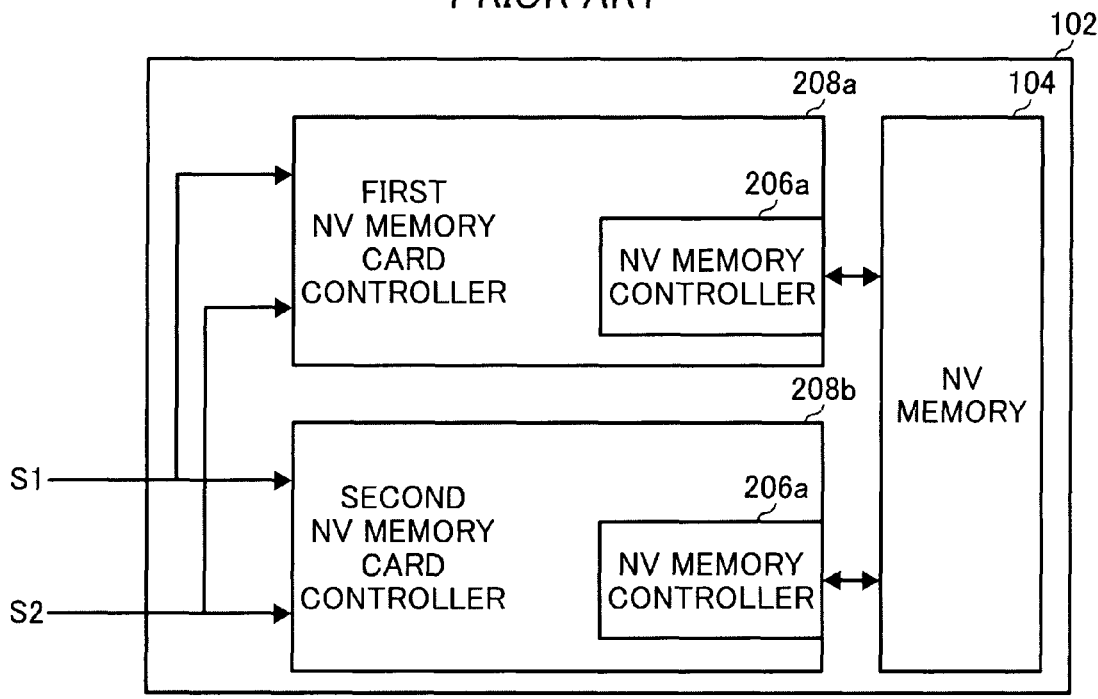
FIG. 2 is an illustration of another background nonvolatile memory card having two different memory card interfaces.
Figure 3:
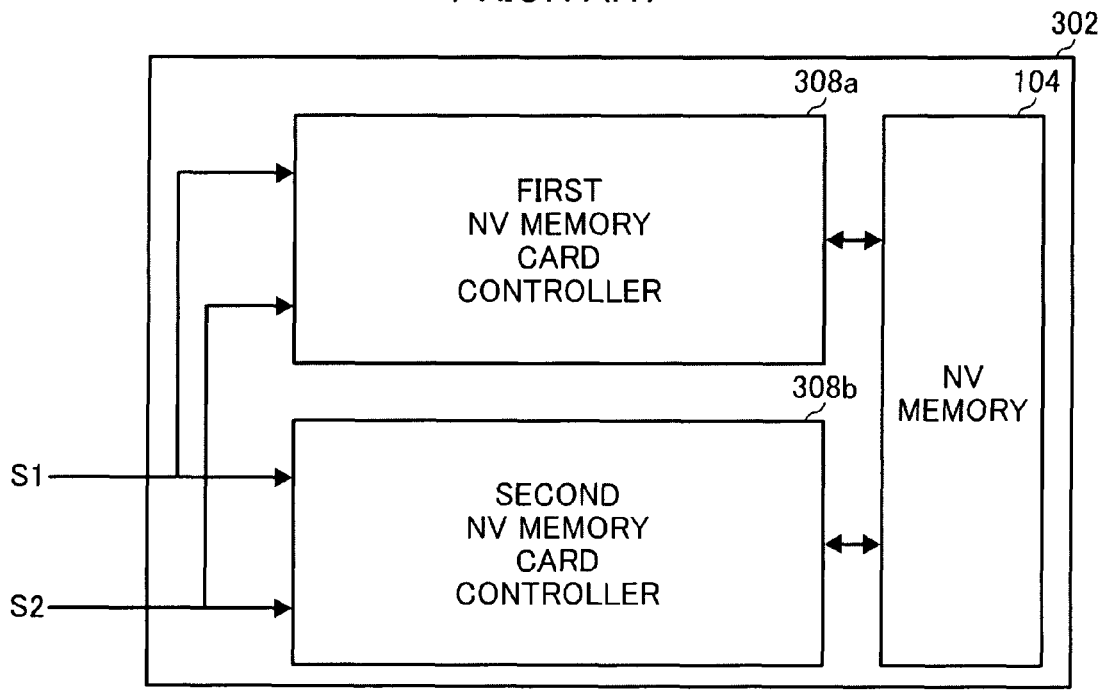
FIG. 3 is an illustration of another background nonvolatile memory card having two different memory card interfaces.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

It will be understood that if an element or layer is referred to as being "on", "against", "connected to" or "coupled to"

another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would hen be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to described various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, exemplary embodiments of the present patent application are described.

Figure 4:
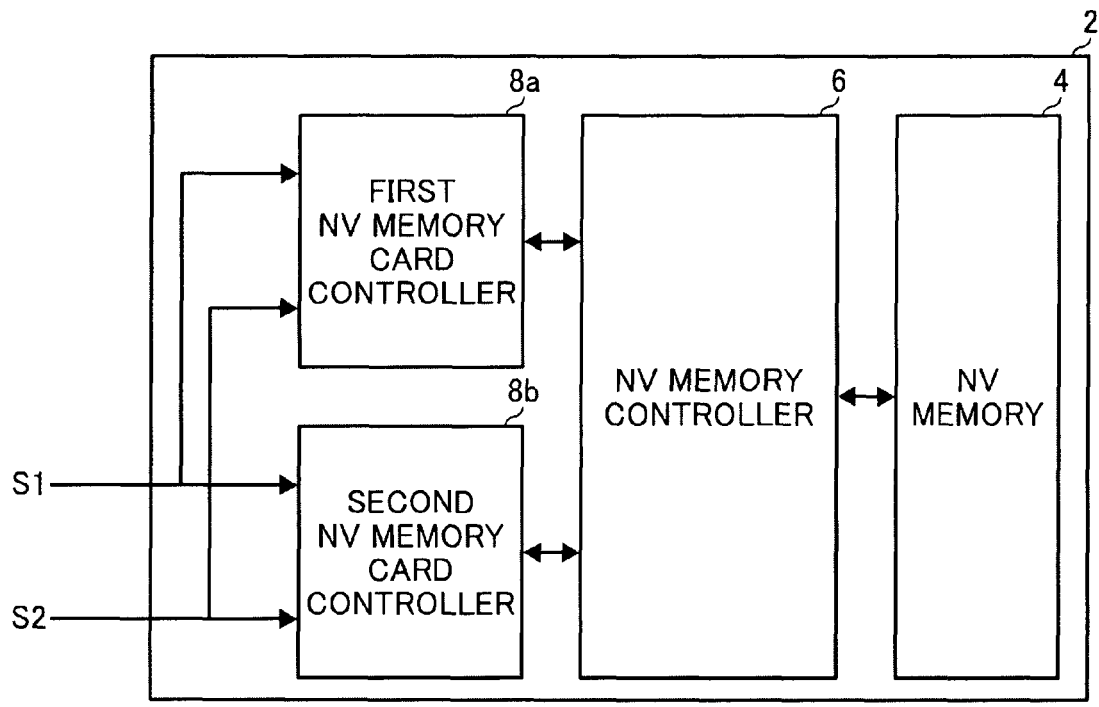
FIG. 4 is an illustration of an exemplary nonvolatile memory card according to an exemplary embodiment of the present disclosure.

Referring to FIG. 4 of the drawings, a nonvolatile (NV) memory card 2 according to at least one exemplary embodiments of the present disclosure is described. As illustrated in FIG. 4, the NV memory card 2 includes a nonvolatile (NV) memory 4, a nonvolatile (NV) memory controller 6, and first and second nonvolatile (NV) memory card controllers 8a and 8b. The NV memory 4 stores data. The NV memory controller 6 controls read and write operations relative to the NV memory 4 and an interfacing operation relative to the first and second NV memory card controllers 8a and 8b. The first and second NV memory card controllers 8a and 8b receive an interface signal S1 and a select signal S2 from a host computer (not shown) to interface data transmission between the host computer and each of the first and second NV memory card controllers 8a and 8b. The interface signal S1 transmits data to and from the first and second NV memory card controllers 8a and 8b, and the select signal S2 switches between the first and second NV memory card controllers 8a and 8b.

The NV memory card 2 is a single memory card combining two memory cards having different compatibilities in ways of controlling, communicating, etc. and in electric properties, for example. It is possible to combine more than two nonvolatile memory cards in a similar manner.

In the NV memory card 2 of FIG. 4, the NV memory controller 6 is independently provided relative to the first and second NV memory card controllers 8a and 8b. In this structure, the NV memory controller 6 preferably includes a converter for converting a physical format of data. This feature allows each of the first and second NV memory card controllers 8a and 8b, and even the NV memory controller 6, to flexibly operate with various kinds of data format.

In FIG. 4, each of the first and second NV memory card controllers 8a and 8b is connected with the NV memory controller 6 via an independent bus. It is, however, possible to connect them with a common bus, as an alternative.

As described above, the NV memory card 2 is provided with the NV memory controller 6 which is a singular and independent memory controller so as to access in a singular physical data format to the NV memory 4. Therefore, the size of circuitry becomes relatively small. Furthermore, if the NV memory controller 6 is provided with an appropriate physical data format, it allows a wide selection of a nonvolatile memory card controller for each of the first and second NV memory card controllers 8a and 8b to flexibly operate with various kinds of data format.

Figure 5:
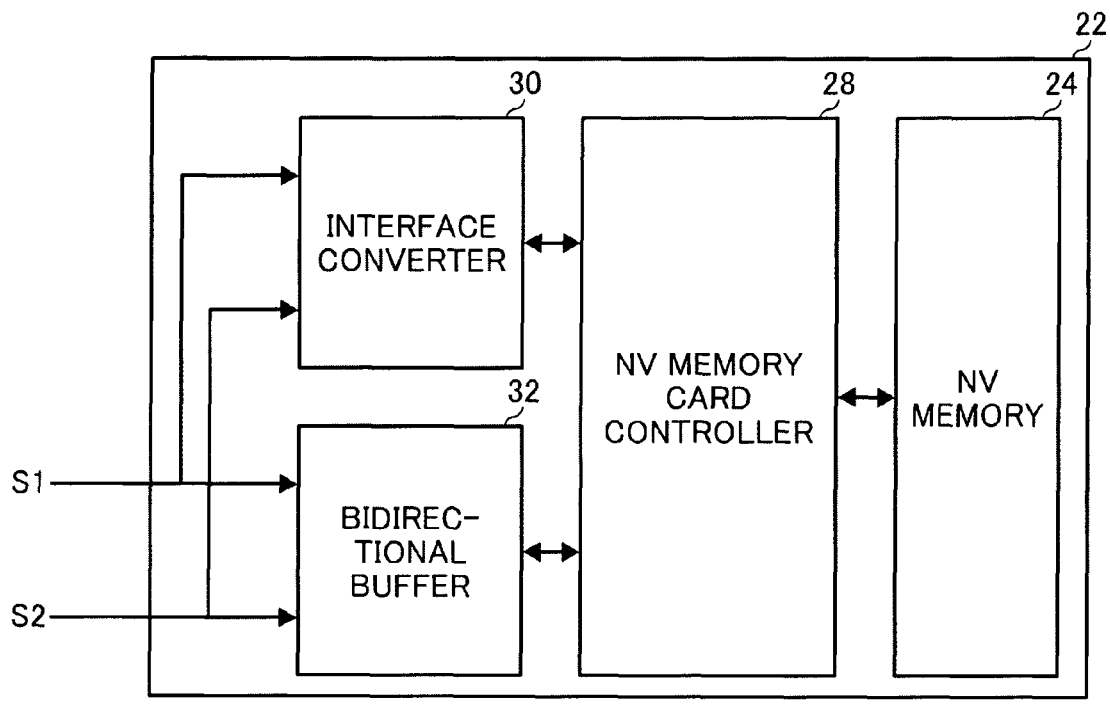
FIG. 5 is an illustration of an exemplary nonvolatile memory card according to another exemplary embodiment of the present disclosure.

Referring to FIG. 5, a nonvolatile (NV) memory card 22 according to at least another exemplary embodiments of the present disclosure is described. The NV memory card 22 of FIG. 5 is similar to the NV memory card 2 of FIG. 4, except for a nonvolatile (NV) memory card controller 28, a nonvolatile (NV) memory card interface converter 30, and a bidirectional buffer 32. Stated another way, the NV memory card 22 further includes a nonvolatile (NV) memory 24, which may be similar to the NV memory 4 included in the NV memory card 2 depicted in FIG. 4.

The NV memory card 22 is a single memory card combining two memory cards having different compatibilities in ways of controlling, communicating, etc. and in electric properties, for example. In the NV memory card 22, the NV memory card controller 28 is singularly configured to access to the NV memory 24 by using a data transmission protocol. The NV memory card interface converter 30 converts a data transfer protocol of a different nonvolatile (NV) memory card into the data transfer protocol of the NV memory card controller 28. Thus, the different NV memory card can be used as a second memory installable card in the NV memory card 2.

In FIG. 5, when the interface signal S1 transmits data of a first NV memory card which is supposed to be operable with the NV memory card controller 28, the select signal S2 enables the bidirectional buffer 32. Then, the NV memory card controller 28 directly handles access via the bidirectional buffer 32 based on the interface signal S1.

When the interface signal S1 transmits data of a second NV memory card which is supposed to be a different NV memory card, the select signal S2 enables the NV memory card controller converter 30 to convert a data transfer protocol of the second NV memory card into the data transfer protocol of the first NV memory card. The NV memory card controller 28 handles the converted data transfer protocol as access based on the interface signal S1.

In this way, the NV memory card 22 can allow the NV memory card controller 28 to easily handle two different accesses to the NV memory 24. Therefore, by appropriately configuring the NV memory card controller converter 30, the NV memory card 22 can properly handle data of various data transfer protocols sent through the interface signal S1.

Numerous additional modifications and variations are possible in light of the above teachings. It is therefore to be understood that within the scope of the appended claims, the disclosure of this patent specification may be practiced otherwise than as specifically described herein. For example, elements and/or features of different examples and illustrative embodiments may be combined with each other and/or substituted for each other within the scope of this disclosure and appended claims.

This patent specification is based on Japanese patent application, No. JPAP2006-044922 filed on Feb. 22, 2006 in the Japan Patent Office, the entire contents of which are incorporated by reference herein.

What is claimed is:

1. A nonvolatile memory card, comprising:
 a nonvolatile memory;
 two or more nonvolatile memory card controllers, having properties different from each other; and
 a nonvolatile memory controller configured to commonly operate with the two or more nonvolatile memory card controllers to interface data access from each of the two or more nonvolatile memory card controllers to the nonvolatile memory,
 wherein the two or more nonvolatile memory card controllers simultaneously perform direct communication of read/write data with an external host,
 wherein the two or more nonvolatile memory card controllers both directly receive an interface signal and a select signal from the external host, and
 wherein the interface signal communicates said read/write data between the external host and the two or more nonvolatile memory card controllers simultaneously, and
 wherein the select signal includes switch instructions for switching on/off the operation of the first or second nonvolatile memory card controllers.

2. The nonvolatile memory card of claim 1, wherein the nonvolatile memory controller includes a physical format converter for converting a physical format of data to be accessed during data access between the nonvolatile memory and each of the two or more nonvolatile memory card controllers.

3. The nonvolatile memory card of claim 1, wherein the nonvolatile memory controller includes a physical format converter for converting a physical format of data during data access to the nonvolatile memory to a singular physical data format.

4. A nonvolatile memory card, comprising:
 a nonvolatile memory;
 a nonvolatile memory card controller;
 a nonvolatile memory card interface converter configured to convert at least one kind of nonvolatile memory card interface including a first nonvolatile memory card interface into a second nonvolatile memory card interface; and
 a bidirectional buffer,
 wherein the first nonvolatile memory card interface represents a nonvolatile memory card interface directly coupled to the nonvolatile memory card interface converter and the bidirectional buffer,
 wherein a data access relative to a first nonvolatile memory card between the nonvolatile memory card interface and the nonvolatile memory is performed through the bidirectional buffer and the nonvolatile memory card controller, and
 wherein a data access relative to a second nonvolatile memory card between the nonvolatile memory card interface and the nonvolatile memory is performed through the nonvolatile memory card interface converter and the nonvolatile memory card controller, and
 wherein the nonvolatile memory card interface converter and the bidirectional buffer simultaneously perform direct communication of read/write data with an external host,
 wherein the nonvolatile memory card interface converter and the bidirectional buffer both receive an interface signal and a select signal from the external host, and
 wherein the interface signal communicates said read/write data between the external host and the two or more nonvolatile memory card controllers simultaneously, and
 wherein the select signal includes any one of a:
  a first instruction to enable the bidirectional buffer and forward the read/write data directly to the nonvolatile memory card controller via the bidirectional buffer; and
  a second instruction to enable the nonvolatile memory card interface controller to convert the read/write data and forward the converted read/write data directly to the nonvolatile memory card controller.

5. A nonvolatile memory card, comprising:
 a nonvolatile memory;
 a nonvolatile memory card controller;
 a nonvolatile memory card interface converter configured to convert at least one kind of nonvolatile memory card interface including a first nonvolatile memory card interface into a second nonvolatile memory card interface; and
 a bidirectional buffer,
 wherein the first nonvolatile memory card interface represents a nonvolatile memory card interface directly coupled to the nonvolatile memory card interface converter and the bidirectional buffer,
 wherein a data access relative to a first nonvolatile memory card between the nonvolatile memory card interface and the nonvolatile memory is performed through the bidirectional buffer and the nonvolatile memory card controller, and
 wherein a data access relative to a second nonvolatile memory card between the nonvolatile memory card interface and the nonvolatile memory is performed through the nonvolatile memory card interface converter and the nonvolatile memory card controller, and
 wherein the nonvolatile memory card interface converter and the bidirectional buffer simultaneously perform direct communication of read/write data with an external host,
 wherein said data access relative to the first nonvolatile memory card is performed between the bidirectional buffer and the nonvolatile memory card controller directly, and not via the nonvolatile memory card interface converter.

6. A nonvolatile memory card, comprising:
 a nonvolatile memory;
 a nonvolatile memory card controller;

a nonvolatile memory card interface converter configured to convert at least one kind of nonvolatile memory card interface including a first nonvolatile memory card interface into a second nonvolatile memory card interface; and a bidirectional buffer, wherein the first nonvolatile memory card interface represents a nonvolatile memory card interface directly coupled to the nonvolatile memory card interface converter and the bidirectional buffer, wherein a data access relative to a first nonvolatile memory card between the nonvolatile memory card interface and the nonvolatile memory is performed through the bidirectional buffer and the nonvolatile memory card controller, and wherein a data access relative to a second nonvolatile memory card between the nonvolatile memory card interface and the nonvolatile memory is performed through the nonvolatile memory card interface converter and the nonvolatile memory card controller, and wherein the nonvolatile memory card interface converter and the bidirectional buffer simultaneously perform direct communication of read/write data with an external host, wherein said data access relative to the second nonvolatile memory card is performed between the nonvolatile memory card interface converter and the nonvolatile memory card controller directly, and not via the bidirectional buffer.

7. The nonvolatile memory card of claim 6, wherein the nonvolatile memory card interface converter converts a data transfer protocol with respect to the second nonvolatile memory card into a first data transfer protocol.

* * * * *